United States Patent
Stoddard

(10) Patent No.: US 10,018,109 B2
(45) Date of Patent: Jul. 10, 2018

(54) MOMENTUM DRIVEN FUEL INJECTION OF STEAM AND FUEL VAPOR FOR COMPRESSION IGNITION ENGINES

(71) Applicant: Donald Joseph Stoddard, Tooele, UT (US)

(72) Inventor: Donald Joseph Stoddard, Tooele, UT (US)

(*) Notice: Subject to any disclaimer, the term of this patent is extended or adjusted under 35 U.S.C. 154(b) by 524 days.

(21) Appl. No.: 14/670,318

(22) Filed: Mar. 26, 2015

(65) Prior Publication Data
US 2015/0337723 A1  Nov. 26, 2015

Related U.S. Application Data

(60) Provisional application No. 62/002,809, filed on May 24, 2014.

(51) Int. Cl.
| | | |
|---|---|---|
| *F02B 47/02* | (2006.01) | |
| *F02M 25/022* | (2006.01) | |
| *F02M 25/03* | (2006.01) | |
| *F02M 43/04* | (2006.01) | |
| *F02M 61/18* | (2006.01) | |
| *F02M 53/02* | (2006.01) | |
| *F02M 55/00* | (2006.01) | |

(52) U.S. Cl.
CPC .......... *F02B 47/02* (2013.01); *F02M 25/022* (2013.01); *F02M 25/0221* (2013.01); *F02M 25/03* (2013.01); *F02M 43/04* (2013.01); *F02M 53/02* (2013.01); *F02M 55/00* (2013.01); *F02M 55/008* (2013.01); *F02M 61/1806* (2013.01); *F02M 61/1826* (2013.01); *F02M 61/1893* (2013.01); *Y02T 10/121* (2013.01)

(58) Field of Classification Search
CPC .. F02B 47/02; F02M 25/0221; F02M 25/022; F02M 25/03; F02M 25/025; F02M 43/00; F02M 43/02; F02M 43/04; F02M 53/02
See application file for complete search history.

(56) References Cited

U.S. PATENT DOCUMENTS

| | | | | |
|---|---|---|---|---|
| 5,245,953 | A * | 9/1993 | Shimada | F02B 45/00 123/25 C |
| 6,170,441 | B1 * | 1/2001 | Haldeman | F02B 41/04 123/25 D |
| 2008/0141921 | A1 * | 6/2008 | Hinderks | B63B 1/28 114/274 |

* cited by examiner

*Primary Examiner* — Jacob Amick
(74) *Attorney, Agent, or Firm* — Michael F. Krieger; Kirton McConkie

(57) ABSTRACT

The present invention directly affects two primary limitations of diesel fuel: poor vaporization and ease of auto-ignition. Superheated fuel is injected within a cone of steam. As a result, fuel is fully vaporized and steam controls ignition by momentarily isolating fuel from air. In order to achieve high vapor velocities, the present invention uses momentum of circulating fuel and water to propel them through the injector. Momentum is preserved by transfer valves that transfer moving liquids between through paths and injection paths. Momentum is further preserved by an injector design that minimizes turbulence that would absorb energy and reduce injected velocity. The fuel and water may be superheated before injection to convert to steam and vapor upon the release of pressure when injected into the combustion chamber. The injector may also be used to achieve high injection velocity for liquid fuel injection without heating.

8 Claims, 8 Drawing Sheets

MOMENTUM DRIVEN FUEL INJECTION OF STEAM AND FUEL VAPOR FOR COMPRESSION IGNITION ENGINES

CROSS-REFERENCE TO RELATED APPLICATIONS

This application claims the benefit of U.S. Provisional Patent Application No. 62/002,809 which was filed on May 24, 2014.

BACKGROUND OF INVENTION

Field of the Invention

Diesel engines are highly developed and the most efficient of internal combustion engines. They serve every industry and consume a large portion of the global oil supply. They are also a major source of pollution. During the past decades researchers have improved diesel engine reliability, efficiency and emissions. Problems inherent in the combustion process still remain.

The primary limitation for diesel engine combustion is that fuel enters the combustion chamber as a column of liquid fuel. The tip evaporates forming a vapor cloud with a mixture which ranges from 100% fuel to just enough air to burn. Combustion is oxygen-starved and produces soot and other emissions. When fuel at the tip of the injected fuel column vaporizes and mixes with air, it autoignites before the rest of the liquid fuel column has begun to substantially vaporize or mix.

Low Temperature Combustion (LTC) delays autoignition to improve fuel air mixing. The air charge is diluted and cooled by cooled exhaust gas re-circulated into intake air. LTC may also reduce compression ratio and delay exhaust valve closing. These solutions allow more time for fuel-air mixing, but do not change the fuel-air mixing process Summarizing Diesel combustion limitations: 1) Fuel is injected as a liquid; 2) The mixing process does not clearly define a time or place that starts main combustion; 3) The conditions for main hot combustion occur before mixing is complete; 4) Attempts at improvement such as Exhaust Gas Recirculation dilutes and cools the air charge; 5) Fuel mixes throughout the combustion process; and 6) Additional fuel for heavy loads does not mix well.

BRIEF SUMMARY OF THE INVENTION

Embodiments of the present invention utilize momentum to inject fuel at higher velocity into the combustion chamber resulting in better combustion. A novel transfer valve allows liquid fuel traveling at a high rate of speed to be diverted within the injector and injected into the combustion chamber. Momentum of the moving liquid transferred through the transfer valve produces higher liquid velocity than achieved with earlier injectors or high pressure fuel rail injector systems.

Some embodiments also heat fuel or fuel and water prior to injection. Liquid is piped through heaters and superheated such that it would vaporize except for pressure in the liquid passages. Superheated liquids then circulate through the injector transfer valve until injection when the transfer valve diverts liquid into the injector outlet passages and into the combustion chamber. Momentum of circulating liquid produces high velocity liquid flow within the injector passages.

If fuel or water is allowed to vaporize in the circulating fluid loop, vapor would compress and it would not transfer momentum into force for high velocity injection. Fluids must therefore not vaporize in the momentum conserving circulating loop.

In one embodiment, superheated fuel and superheated water share common passages and timing of superheated fuel and superheated water delivery controls combustion. One injection sequence for superheated liquids is water, fuel and water, and water. As water (steam) is injected, it cools air in the fuel path and creates an air free zone. Fuel that follows is momentarily isolated from air and does not ignite until it passes through the steam cloud and mixes with air. Timing of the three injection intervals controls ignition. With both fuel and air diluted, combustion may begin with Low Temperature Heat Release (LTHR). During LTHR, fuel vapor would continue to expand and mix into air.

In another embodiment, fuel vapor and steam are injected into the cylinder from concentric tubes in the injector outlet. Fuel vapor is in an inner tube and steam is in the outer tube. As a result injected fuel vapor is contained within a tube of steam which isolates the fuel vapor from air in the combustion chamber. Upon injection fuel as a superheat liquid bullet or as vapor would be surrounded by superheated water or steam. In fact, steam might be injected first to cool and dilute air in the injection path. In this scenario, fuel vapor may be carried deep into the combustion chamber and be well distributed. When the fuel and air penetrate the steam barrier combustion would begin from a far better condition than exists in liquid fuel injection.

When injecting liquid fuel, concentrated mass preserves momentum and sustains velocity. In contrast, when injecting fuel vapor, molecules are no longer held together by surface tension. The momentum of individual molecules is quickly absorbed by air. For this reason, injected vapor velocity must be significantly higher than liquid velocity. The present invention addresses this challenge by use of momentum rather than fuel rail pressure. In addition, enlarging passage diameter at the outlet causes liquids to vaporize. By vaporizing fuel in confined passages, the typical random motion may be converted to forward motion. The length of the widened passage may be used to collimate the beam. As fuel crosses the combustion chamber, the beam of fuel vapor may be narrower than the expanding superheated fuel bullet. Forward velocity of the vapor beam may be higher to begin with and may remain higher than that of the superheated fuel bullet.

In order to superheat fuel and water, liquid is piped through exhaust heated heat exchangers. Fuel and/or water are superheated such that they would vaporize except for pressure from the high pressure pumps. Superheated liquids then circulate through the injector transfer valves until injection. The inlet and outlet manifolds of the heat exchanger may be split into two 180 degree segments separately superheating fuel and water and produces.

DETAILED DESCRIPTION OF PREFERRED EMBODIMENTS

Figure 1:
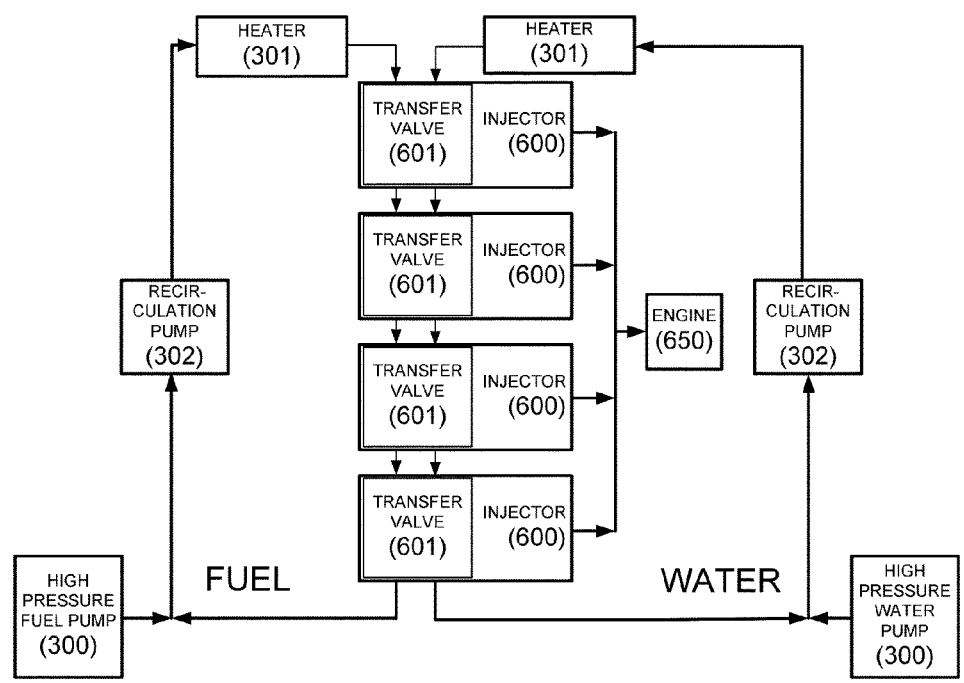
FIG. 1 is a block diagram of one embodiment of the present invention.

Embodiments of the present invention utilize momentum to inject fuel farther into the combustion chamber resulting in better combustion. A transfer valve allows fuel traveling at a high rate of speed to be diverted within the injector and injected into the combustion chamber. Momentum produces higher velocity than do present high pressure common rail injection systems. Some embodiments also superheat fuel and water prior to injection.

Superheated water may be used in combination with superheated fuel with a plume of steam enclosing a plume of fuel vapor. As fuel and air mix into steam, the steam may cool and delay combustion until ignition starts at the tip of the injected fuel-steam jet.

The time to ignition at the tip of the fuel-steam jet may be controlled by adjusting the delay from the start of steam injection to the start of fuel vapor injection. If fuel vapor were injected ahead of steam, combustion would begin immediately. Starting steam first, delays air-fuel mixing and controls ignition at the tip of the jet.

Once fuel ignites at the tip of the jet, pressure begins to build and combustion spreads. Timing of the fuel versus steam injection may also adjust the Pressure Rise Rate.

The onset of hot main combustion is the same for both light and heavy loads. The leading edge of the steam fuel vapor injection is very similar for low and heavy loads. For low load conditions, fuel vapor injection would be brief. However, steam injection may be unchanged. Steam would carry the jet across the cylinder which would ignite at the leading edge. For light or heavy loads, timing of fuel and steam injection at the leading edge may be the same. However, for heavy loads, fuel vapor injection would continue longer. As a result, combustion would continue longer consuming fuel delivered later for heavy loads.

The above paragraphs have described use of steam to isolate fuel vapor from air and thereby control combustion events. Another embodiment of the present invention is to use increased injection velocity. Hypersonic velocities are a possibility. For hypersonic velocity, fuel will travel faster than a pressure wave from initial combustion. That would enable fuel delivered later to pass through the combustion surface and pass into fresh air.

Superheated fuel may remain liquid until it enters the combustion chamber. Momentum may be largely preserved, if fuel forward velocity is greater than lateral expansion velocity.

Another embodiment utilizes superheated fuel to vaporize within the injector outlet passages. This option has the advantage of converting the thermal energy of the superheated fuel into forward velocity which would be much greater than that of liquid fuel.

The superheated fuel is injected as a liquid or a vapor. For small passage diameters, interference with closely spaced walls narrows the effective passage and creates too much back pressure for vapor to propagate ahead of the liquid. When the passage diameter is widened at the outlet end, superheated fuel vaporizes. The length of this widened section may be designed to produce a collimated beam of injected vapor fuel. Velocity of the collimated beam may be several times sonic velocity.

In another embodiment, superheated fuel and superheated water are gated into common passages. In this embodiment, the sequence and timing of fuel and water injection may control combustion. Consider a sequence of water (steam), fuel and water (steam). Steam would first cool and dilute the air in the injection path. In addition, delay between the start of water injection and fuel injection may control ignition timing. Starting steam early would delay the time until fuel at the tip mixed through the steam, into air and ignited. Adjusting the time between start of steam and start of fuel may control ignition timing at the tip of the fuel injection. Initiating combustion at the tip would involve less fuel and would thereby reduce Pressure Rise Rate (PRR) and reduce stress on engine components which is of critical importance.

Another sequence might be: water, fuel and water, and water. The effects noted above would be the same. However, combining fuel and water would dilute fuel vapor slowing ignition and increasing mixing. In addition, velocity for the combined fluids would be higher providing better penetration.

The embodiments of the present invention have the following advantages: 1) Fuel is injected as a vapor; 2) The start of main combustion may be controlled; 3) Mixing is well advanced before combustion starts; 4) The air charge is not diluted or cooled; 5) Mixing and combustion may complete early in the combustion process; 6) The combustion process is substantially the same for varying loads.

Rapid Fuel Delivery

In the present invention, fuel and water momentum accelerate delivery. Transfer valves in the injectors are placed in the fuel rail so that circulating liquid continuously passes through the transfer valves. At injection, the liquid flow is transferred into the injection path. Momentum of liquid flowing into the transfer valves sustains constant liquid flow which is now delivered into the injection path.

Turbulence in the injector passages dissipates energy and reduces velocity. For this reason passages in the injector must provide laminar flow as much as possible. One embodiment that helps meet that requirement is the use of "micro-tubing". This tubing may be formed with large smooth radius turns between the inlet transfer valve and the injector outlets which minimize the number of turbulence producing transitions. "Micro" tubing is commercially available with internal diameters as low as 0.007 inches.

Success of the apparatus depends on the injector which must do at least four things. First, inject high velocity fuel vapor and steam. Second, place fuel vapor within a protective sheath of steam. Third, deliver fuel vapor and steam independently. Fourth, rapidly deliver fuel vapor and steam quantities required.

A better understanding of the present invention can be obtained when the following detailed description of the preferred embodiments is considered in conjunction with the following drawings, in which:

FIG. 1 is a block diagram for a Momentum Driven Superheated Fuel and Superheated Water Injection Apparatus. Liquid fuel and water are supplied by high pressure pumps (300) into the inlet of the recirculation pump (302) and then into heaters (301) where they are superheated. Superheated fuel and water (220 and 120 not shown) are circulated through the transfer valves (601) of the Injector (600) back into the inlet of the recirculation pump (302). At injection the transfer valves (601) transfer superheated fuel and superheated water (220 and 120 not shown) into the delivery passages of the injector (600). Fuel vapor and steam (200 and 100 not shown) are injected into the combustion chambers of the engine (650). There are separate pumps and heaters for fuel and water, but only one set of injectors. Without the heater (301) this apparatus becomes a momentum driven high velocity liquid fuel injection system.

In FIG. 1 there are two circuits or loops. One for fuel and one for water. Beginning at the bottom left, a high pressure pump (300) sends fuel into a circulating pump (302) which circulates fuel through a heater (301) through the fuel port of the transfer valves (601) in the injectors (600) and back to the inlet of the circulation pump (302). Starting again at the bottom right, a high pressure pump (300) sends water into the circulating pump (302) which circulates fuel through a heater (301) through the water port of the transfer valves (601) in the injectors (600) and back to the inlet of the circulation pump (302). At injection, momentum of the circulating fluids is transferred through the transfer valves (601) and produces force for increased injection velocity. Superheated fuel and superheated water (220 and 120 not shown) are delivered into the delivery passages of the injector (600). Superheated fluids may be delivered into the engine (650) as high velocity beams of superheated liquids or as high velocity beams of vapors depending on injector outlet passage design.

Without the heaters (301), FIG. 1 becomes a high velocity injection apparatus and may achieve higher liquid fuel injection velocity than is obtained with any other known injection method. In addition this apparatus does not require the high pump pressure typical of common rail injection apparatus. As a result the required pumps will be less expensive.

Figure 2:
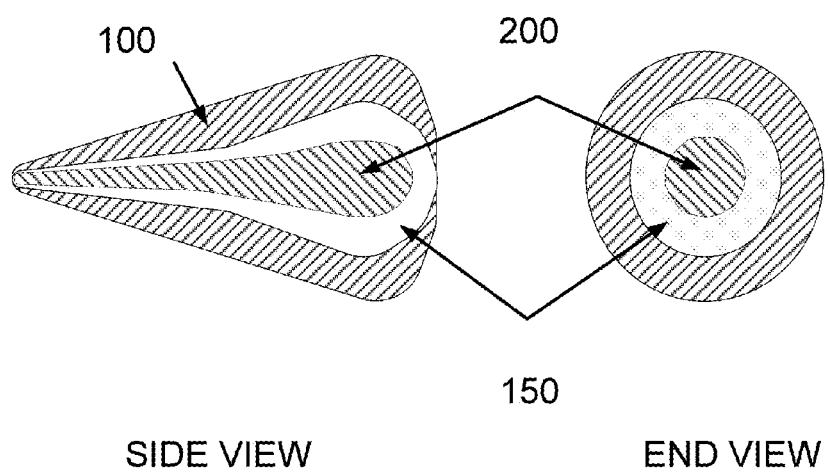
FIG. 2 depicts injected fuel vapor within a plume of steam.

FIG. 2 depicts injected fuel vapor (200) within a plume of steam (100). Also shown is the steam and fuel vapor mixture (150) which develops and expands as fuel vapor (200) mixes into steam (100). Air mixing into steam (100) is not shown.

Figure 3:
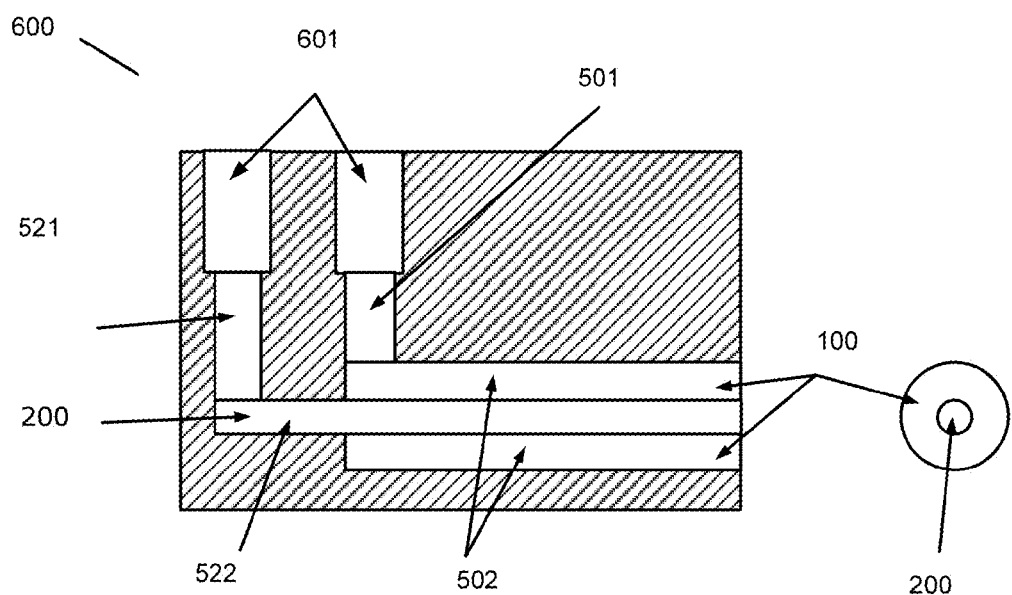
FIG. 3 is a schematic depicting the outlet passages of an injector as it injects fuel vapor within a column of steam.

FIG. 3 is a schematic depicting the outlet passages of an injector (600) that injects fuel vapor (200) within a column of steam (100). Superheated fuel and superheated water (220 and 120 not shown) enter the transfer valves (601) and pass separately into the superheated fuel and superheated water passages (521 and 501). The superheated liquids enter the fuel vapor and steam passages (522 and 502) and exit to the right as fuel vapor (200) and steam (100). The steam and fuel vapor passages (502 and 522) are concentric coaxial tubes with fuel vapor (200) in the inner tube and steam (100) in the outer tube.

Figure 4:
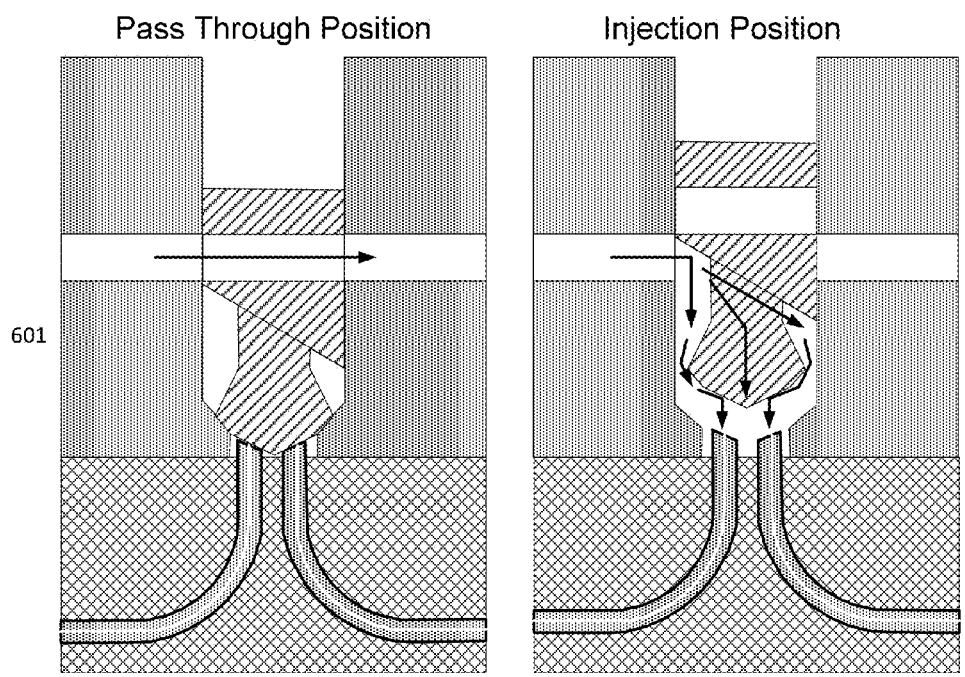
FIG. 4 depicts a transfer valve in pass-through and injection positions.

FIG. 4 depicts a transfer valve (601) in a pass through position and in an injection position. The arrows depict liquid flowing through the transfer valve to maintain momentum and then being diverted into the fuel vapor and steam passages (522 and 502) which are shown as microtubing.

Figure 5:
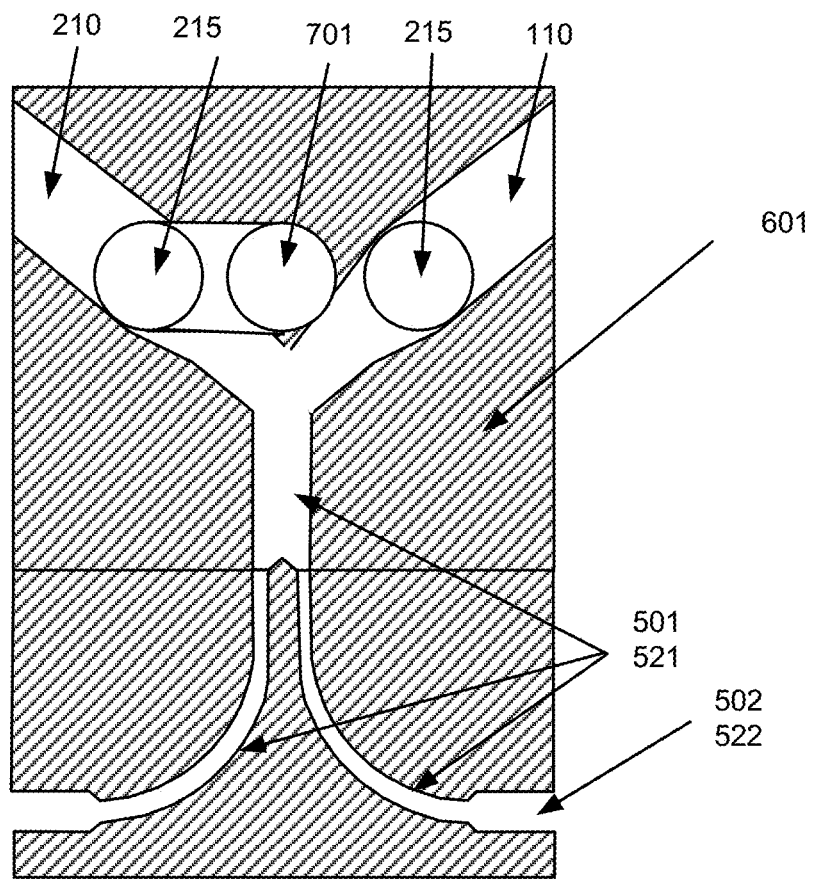
FIG. 5 is an injector cross-sectional side view of one embodiment.

FIG. 5 is an injector cross-sectional side view. Depicted are an upper section which forms the transfer valves (601) for both fuel and water. The fuel inlet (210) brings fuel to the valve piston (215) which passes fuel to the fuel through passage (701) into the circulating fuel rail (220) (not shown). On the upper right the water inlet (110) brings water to the valve piston (215) to the water through passage (701) (not shown). Super heated fuel and water enter the superheated fuel and water passage (501 and 521) which is depicted as a vertical path from the valve pistons (215) into the radius turn indicating a micro-tubing embodiment. Widening of the passage creates the fuel and steam vaporization and collimating passages (502 and 522).

Figure 6:
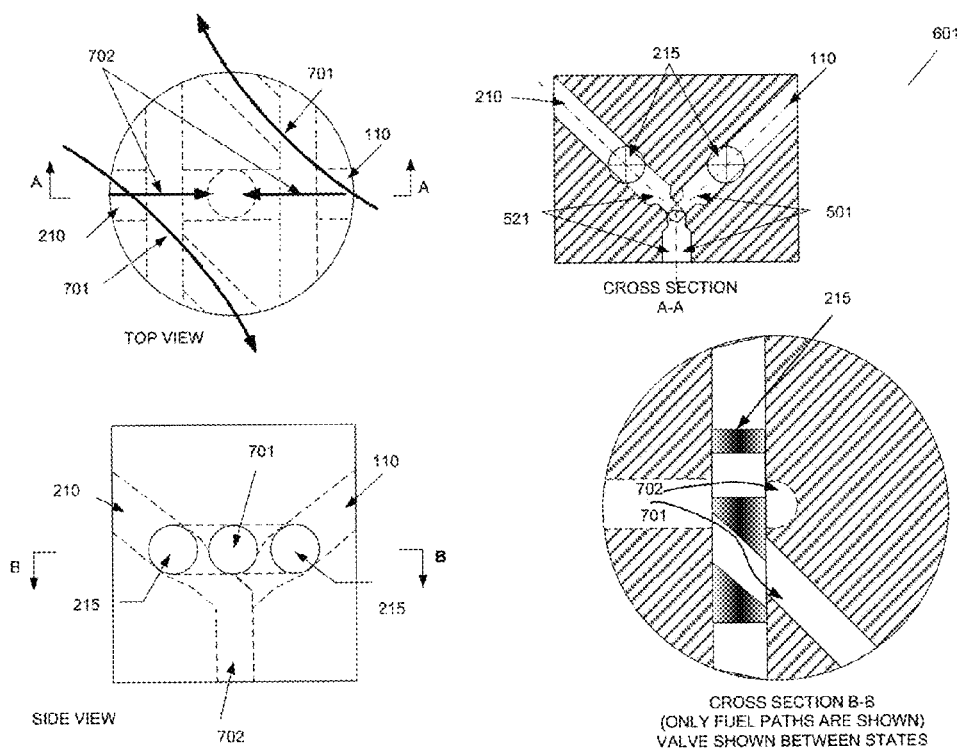
FIG. 6 depicts one embodiment of a transfer valve.

FIG. 6 depicts the transfer valve (601) which is the upper section of an injector. Looking at the top left figure, the fuel inlet (210) enters from the left with the through passages (701) indicated by the dark curved arrows. The superheated water inlet (110) is on the right. Straight arrows from the left and the right indicate the injection passages (702). Looking at the top right figure, Fuel and water entries (210 and 110) are shown at top corners. During injection fluids pass through the valve pistons (215) into the superheated fuel and water passages (501 and 521) and into the lower part of the injector (not shown). The bottom right figures shows the valve piston (215) momentarily passing fuel in both the injection passages (702) and the through passage (701), The bottom left figure depicts the fuel inlet (210), the through passage (701) fuel outlet, the valve pistons (215), the water inlet (110) and the injection passage (702).

Figure 7:
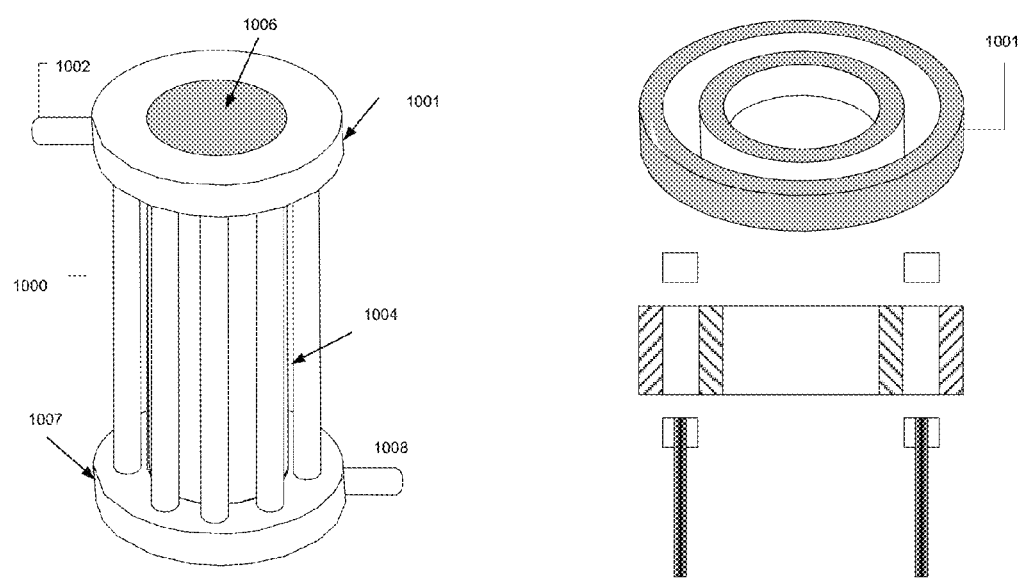
FIG. 7 depicts one embodiment of a heat exchanger.

FIG. 7 depicts a heater for fuel vapor and steam injection. Liquid enters a heat exchanger 1000, through an inlet 1002 and travels into an inlet manifold 1001 and then through heater tubes 1004 located circumferentially about an exhaust passage 1006 through which exhaust from the engine passes. As the exchanger 1000 extracts heat from the exhaust, the heat warms heater tubes 1004 attached circumferentially around exhaust passage 1006. Liquid passing through heater tubes 1004 is warmed and then exits exchanger 1000 through an outlet manifold 1007 and then through outlet 1008.

Figure 8:
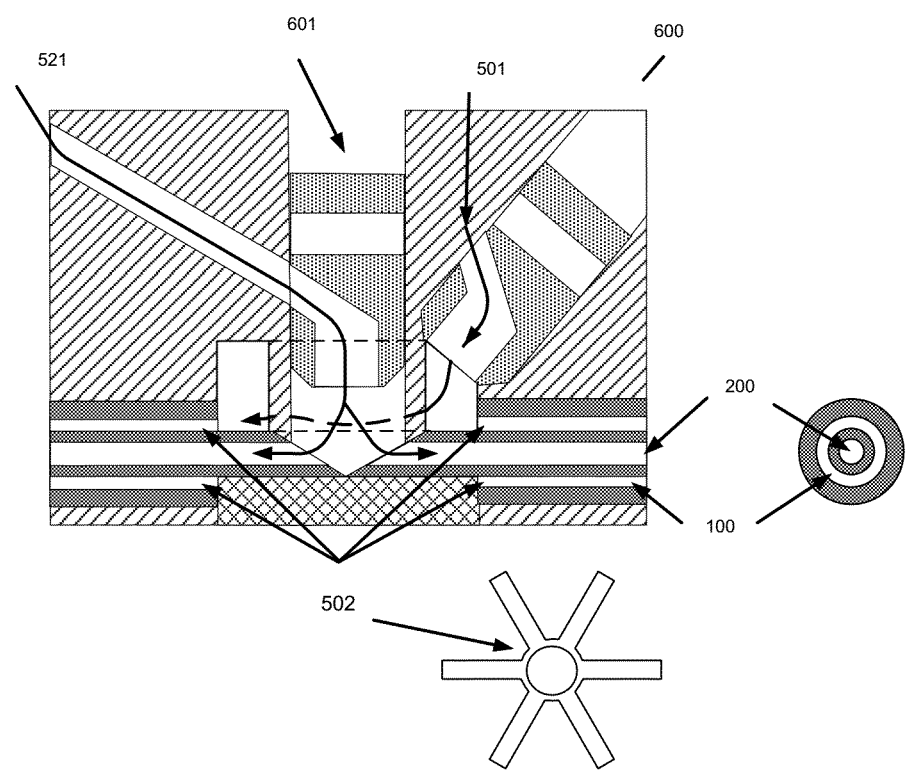
FIG. 8 depicts one injector embodiment showing both fuel and water inlets and multiple injector outlets.

FIG. 8 illustrates an embodiment with both superheated fuel and water inlets and multiple injector outlets. Superheated fuel travels through passage (521) while super-heated water flows through passage (501) in injector (600). Steam (100) travels through passages (502) and fuel vapor (200) flows through passages (522) to exit the injector in the center. The steam exits the injector tip through the first concentric ring shown in the end view of the injector.

The present invention has potential to carry out the objects and attain the ends and advantages mentioned, as well as others inherent therein. While the invention has been depicted, described, and defined by reference to exemplary embodiments of the invention, such references do not imply a limitation on the invention, and no such limitation is to be inferred. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:
1. A high velocity liquid and vapor fuel injection apparatus for diesel engines comprising:
   fuel;
   water;
   sets of pressure pump and circulation pumps for water;
   sets of pressure pumps and circulation pumps for fuel;
   an injector;
   injector through passages, wherein said circulation pumps maintain constant flow through said injector through passages;
   injector outlet passages, wherein said apparatus uses momentum in said through passages to generate forces within said injector outlet passages to increase injection velocity;
   injector transfer valve, wherein said transfer valves momentarily divert flow in said injector through passages into said injector outlet passages; and
   exhaust heated heat exchangers.
2. The fuel injection apparatus of claim 1, wherein pressure of said fuel pressure pump prevents vaporization of superheated said fuel until the fuel is injected into the injector outlet passage.

3. The fuel injection apparatus of claim 1, wherein pressure of said water pressure pump prevents vaporization of superheated said water until said water is injected into said injector outlet passage.

4. The fuel injection apparatus of claim 1, wherein said injector outlet passage wall-to-wall spacing maintains pressure to initially prevents vaporization of superheated said fuel, but allows vaporization of said fuel as the wall-to-wall spacing increases causing pressure reduction such that the liquid fuel vaporizes before injection into a combustion chamber.

5. The fuel injection apparatus of claim 1, wherein said injector outlet passage wall-to-wall spacing prevents vaporization of superheated said water, but allows vaporization as the wall-to-wall spacing increases thereby allowing pressure to drop such that liquid water vaporizes before injection into a combustion chamber.

6. The fuel injection apparatus of claim 1, wherein said injector outlet passages are common for fuel and water.

7. The fuel injection apparatus of claim 1, wherein separate outlet injector passages are provided for said fuel and said water.

8. The fuel injection apparatus of claim 7, wherein said outlet injector passages are coaxial, formed by one tube within another.

* * * * *